United States Patent
Qi et al.

(10) Patent No.: US 9,835,786 B2
(45) Date of Patent: Dec. 5, 2017

(54) DISPLAY BACKLIGHT WITH DIFFRACTIVE AND REFRACTIVE LIGHT SCATTERING STRUCTURES

(75) Inventors: Jun Qi, Cupertino, CA (US); Victor H. Yin, Cupertino, CA (US); Wei Chen, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 285 days.

(21) Appl. No.: 13/586,573

(22) Filed: Aug. 15, 2012

(65) Prior Publication Data
US 2014/0049726 A1 Feb. 20, 2014

(51) Int. Cl.
*G02F 1/1335* (2006.01)
*G02B 3/00* (2006.01)
*F21V 8/00* (2006.01)

(52) U.S. Cl.
CPC ......... *G02B 6/0043* (2013.01); *G02B 6/0016* (2013.01); *G02B 6/0065* (2013.01); *G02F 1/133615* (2013.01)

(58) Field of Classification Search
USPC .......................................................... 349/65
See application file for complete search history.

(56) References Cited

U.S. PATENT DOCUMENTS

| | | | |
|---|---|---|---|
| 6,473,554 B1 | 10/2002 | Pelka et al. | |
| 6,700,634 B2 | 3/2004 | Taniguchi et al. | |
| 6,995,820 B2 | 2/2006 | Amimori et al. | |
| 7,557,876 B2 | 7/2009 | Lazarev et al. | |
| 7,864,395 B2 | 1/2011 | Chui | |
| 8,179,034 B2 | 5/2012 | Potts et al. | |
| 2003/0086030 A1* | 5/2003 | Taniguchi et al. | 349/61 |
| 2005/0063657 A1* | 3/2005 | Huang et al. | 385/129 |
| 2005/0254258 A1 | 11/2005 | Lee | |
| 2006/0126142 A1* | 6/2006 | Choi | G02B 6/0018 359/15 |
| 2008/0284719 A1 | 11/2008 | Yoshida | |
| 2009/0251752 A1* | 10/2009 | Gruhlke | G02B 6/0061 359/15 |

(Continued)

FOREIGN PATENT DOCUMENTS

| | | |
|---|---|---|
| CN | 1380575 A | 11/2002 |
| CN | 1417625 A | 5/2003 |
| CN | 1444057 A | 9/2003 |

(Continued)

*Primary Examiner* — Lauren Nguyen
(74) *Attorney, Agent, or Firm* — Treyz Law Group, P.C.; Zachary D. Hadd; Kendall W. Abbasi (57) ABSTRACT

An electronic device display may have display layers that provide images for a user. Backlight structures may provide backlight for the display layers. The backlight structures may include a light source such as an array of light-emitting diodes. A light guide plate in the backlight structures may be used to distribute the light from the light-emitting diodes throughout the display. The light guide plate may have a main rectangular area that overlaps the display. The main rectangular area may have refractive light scattering structures such as a layer containing clear beads. The refractive light scattering structures may scatter light from the light guide plate for use as backlight. A strip of light diffracting structures such as holographic structures or grating structures may be used to mix light from the light-emitting diodes along the border of the light guide plate.

19 Claims, 9 Drawing Sheets

(56) References Cited

U.S. PATENT DOCUMENTS

2011/0298696 A1 12/2011 Gu et al.
2013/0039029 A1* 2/2013 Wang .................... G02B 6/0035
362/19

FOREIGN PATENT DOCUMENTS

| CN | 1213332 C | 8/2005 |
|---|---|---|
| CN | 101490604 A | 7/2007 |
| JP | 2004-341308 | 12/2004 |
| JP | 2005038747 | 2/2005 |
| JP | -2010-146771 * | 7/2010 |
| JP | 2010-146771 | 7/2010 |
| JP | 2011527771 | 11/2011 |
| KR | 10-2003-0038294 | 5/2003 |
| WO | 2010005810 | 1/2010 |

* cited by examiner

DISPLAY BACKLIGHT WITH DIFFRACTIVE AND REFRACTIVE LIGHT SCATTERING STRUCTURES

BACKGROUND

This relates generally to electronic devices, and more particularly, to electronic devices with displays.

Electronic devices often include displays. For example, cellular telephones and portable computers often include displays for presenting information to a user. An electronic device may have a housing such as a housing formed from plastic or metal. Components for the electronic device such as display components may be mounted in the housing.

It can be challenging to incorporate a display into the housing of an electronic device. Size and weight are often important considerations in designing electronic devices. If care is not taken, displays may be bulky or may be surrounded by overly large borders. The housing of an electronic device can be adjusted to accommodate a bulky display with large borders, but this can lead to undesirable enlargement of the size and weight of the housing and unappealing device aesthetics.

It would therefore be desirable to be able to provide improved ways to provide displays for electronic devices.

SUMMARY

An electronic device may be provided with a display. The display may have display layers for presenting images to a user of the electronic device. The display may be provided with backlight using backlight structures. The backlight structures may include a light source such an array of light-emitting diodes and a light guide plate.

The display may be a liquid crystal display or a display formed using other types of display technology. A liquid crystal display may include display layers such as polarizer layers, a color filter layer, a thin-film-transistor layer, and a liquid crystal layer.

The backlight structures may use the light guide plate to distribute light from the light-emitting diodes throughout the display. The backlight structures may be formed from a sheet of clear plastic or other transparent material.

The light guide plate may have a main rectangular area that overlaps the display. The main rectangular area may have refractive light scattering structures such as a polymer layer containing clear beads. The refractive light scattering structures may scatter light from the light guide plate for use as backlight. Diffractive light scattering structures such as holographic structures or grating structures may be used to scatter light from the light-emitting diodes before the light enters the main rectangular area. The diffractive light scattering structures may be located along a border region of the light guide plate between the light-emitting diodes and the main rectangular portion of the light guide plate. The diffractive regions may mix the light from the light-emitting diodes so that the backlight scattered from the light guide plate does not exhibit hotspots.

Further features of the invention, its nature and various advantages will be more apparent from the accompanying drawings and the following detailed description of the preferred embodiments.

DETAILED DESCRIPTION

Electronic devices may include displays. The displays may be used to display images to a user. Illustrative electronic devices that may be provided with displays are shown in FIGS. 1, 2, and 3.

Figure 1:
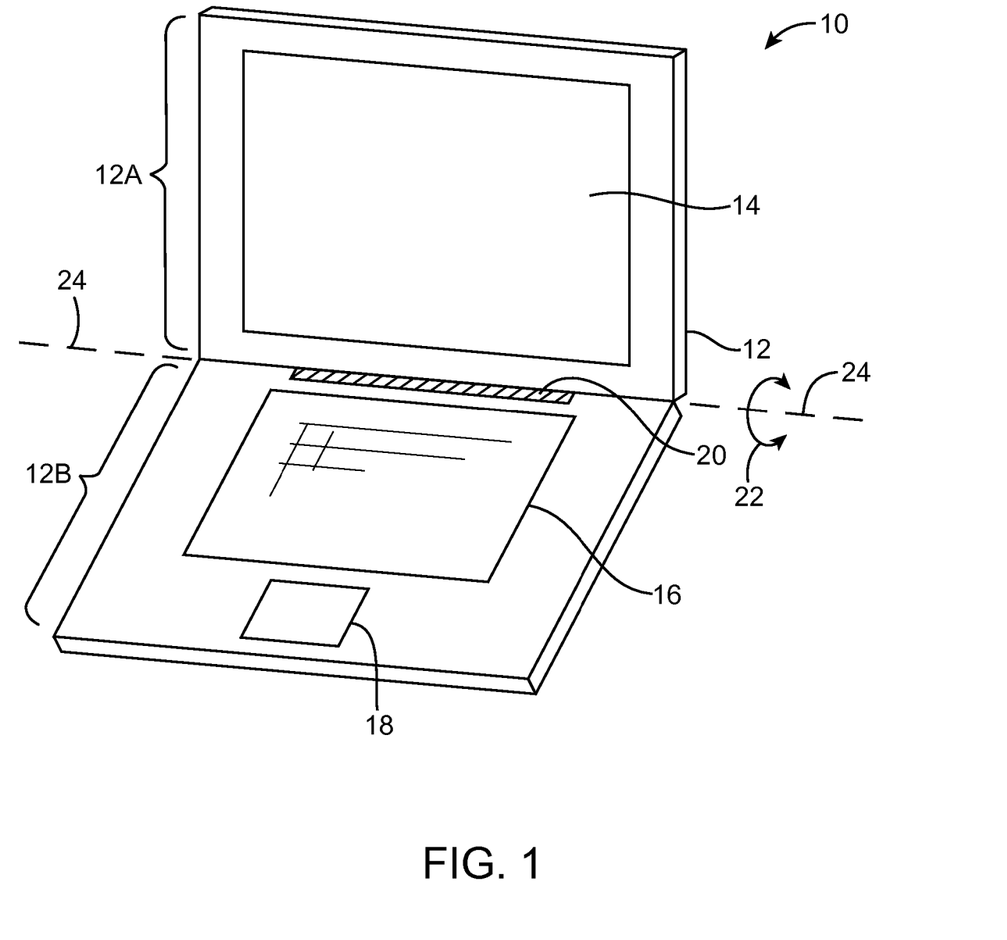
FIG. 1 is a perspective view of an illustrative electronic device such as a laptop computer with a display in accordance with an embodiment of the present invention.

FIG. 1 shows how electronic device 10 may have the shape of a laptop computer having upper housing 12A and lower housing 12B with components such as keyboard 16 and touchpad 18. Device 10 may have hinge structures 20 that allow upper housing 12A to rotate in directions 22 about rotational axis 24 relative to lower housing 12B. Display 14 may be mounted in upper housing 12A. Upper housing 12A, which may sometimes referred to as a display housing or lid, may be placed in a closed position by rotating upper housing 12A towards lower housing 12B about rotational axis 24.

Figure 2:
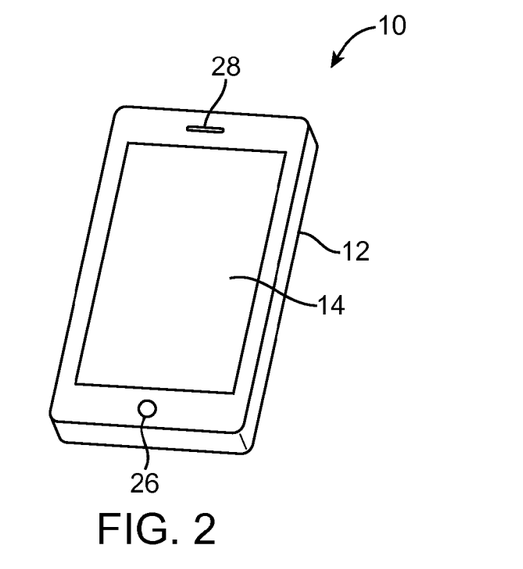
FIG. 2 is a perspective view of an illustrative electronic device such as a handheld electronic device with a display in accordance with an embodiment of the present invention.

FIG. 2 shows how electronic device 10 may be a handheld device such as a cellular telephone, music player, gaming device, navigation unit, or other compact device. In this type of configuration for device 10, housing 12 may have opposing front and rear surfaces. Display 14 may be mounted on a front face of housing 12. Display 14 may, if desired, have a display cover layer or other exterior layer that includes openings for components such as button 26. Openings may also be formed in a display cover layer or other display layer to accommodate a speaker port (see, e.g., speaker port 28 of FIG. 2).

Figure 3:
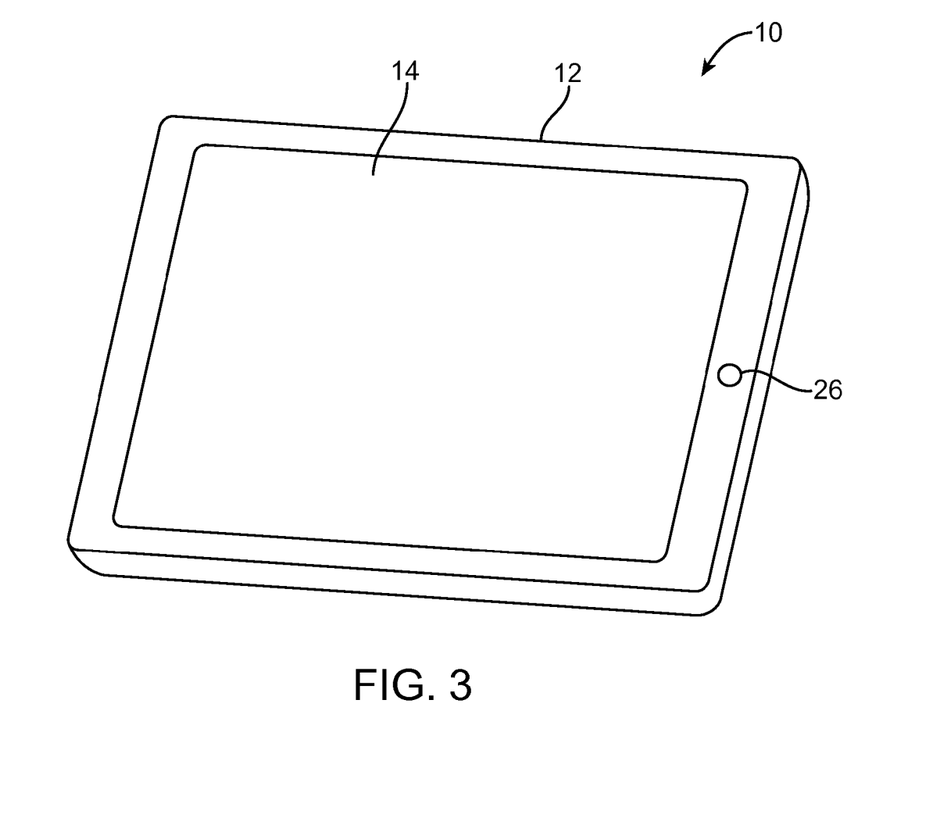
FIG. 3 is a perspective view of an illustrative electronic device such as a tablet computer with a display in accordance with an embodiment of the present invention.

FIG. 3 shows how electronic device 10 may be a tablet computer. In electronic device 10 of FIG. 3, housing 12 may have opposing planar front and rear surfaces. Display 14 may be mounted on the front surface of housing 12. As shown in FIG. 3, display 14 may have a cover layer or other external layer with an opening to accommodate button 26 (as an example).

The illustrative configurations for device 10 that are shown in FIGS. 1, 2, and 3 are merely illustrative. In general, electronic device 10 may be a laptop computer, a computer monitor containing an embedded computer, a tablet computer, a cellular telephone, a media player, or other handheld or portable electronic device, a smaller device such as a wrist-watch device, a pendant device, a headphone or earpiece device, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment.

Housing 12 of device 10, which is sometimes referred to as a case, may be formed of materials such as plastic, glass, ceramics, carbon-fiber composites and other fiber-based composites, metal (e.g., machined aluminum, stainless steel, or other metals), other materials, or a combination of these materials. Device 10 may be formed using a unibody construction in which most or all of housing 12 is formed from a single structural element (e.g., a piece of machined metal or a piece of molded plastic) or may be formed from multiple housing structures (e.g., outer housing structures that have been mounted to internal frame elements or other internal housing structures).

Display 14 may be a touch sensitive display that includes a touch sensor or may be insensitive to touch. Touch sensors for display 14 may be formed from an array of capacitive touch sensor electrodes, a resistive touch array, touch sensor structures based on acoustic touch, optical touch, or force-based touch technologies, or other suitable touch sensor components.

Displays for device 10 may, in general, include image pixels formed from light-emitting diodes (LEDs), organic LEDs (OLEDs), plasma cells, electrowetting pixels, electrophoretic pixels, liquid crystal display (LCD) components, or other suitable image pixel structures. In some situations, it may be desirable to use LCD components to form display 14, so configurations for display 14 in which display 14 is a liquid crystal display are sometimes described herein as an example. It may also be desirable to provide displays such as display 14 with backlight structures, so configurations for display 14 that include a backlight unit may sometimes be described herein as an example. Other types of display technology may be used in device 10 if desired. The use of liquid crystal display structures and backlight structures in device 10 is merely illustrative.

A display cover layer may cover the surface of display 14 or a display layer such as a color filter layer or other portion of a display may be used as the outermost (or nearly outermost) layer in display 14. A display cover layer or other outer display layer may be formed from a transparent glass sheet, a clear plastic layer, or other transparent member.

Touch sensor components such as an array of capacitive touch sensor electrodes formed from transparent materials such as indium tin oxide may be formed on the underside of a display cover layer, may be formed on a separate display layer such as a glass or polymer touch sensor substrate, or may be integrated into other display layers (e.g., substrate layers such as a thin-film transistor layer).

Figure 4:
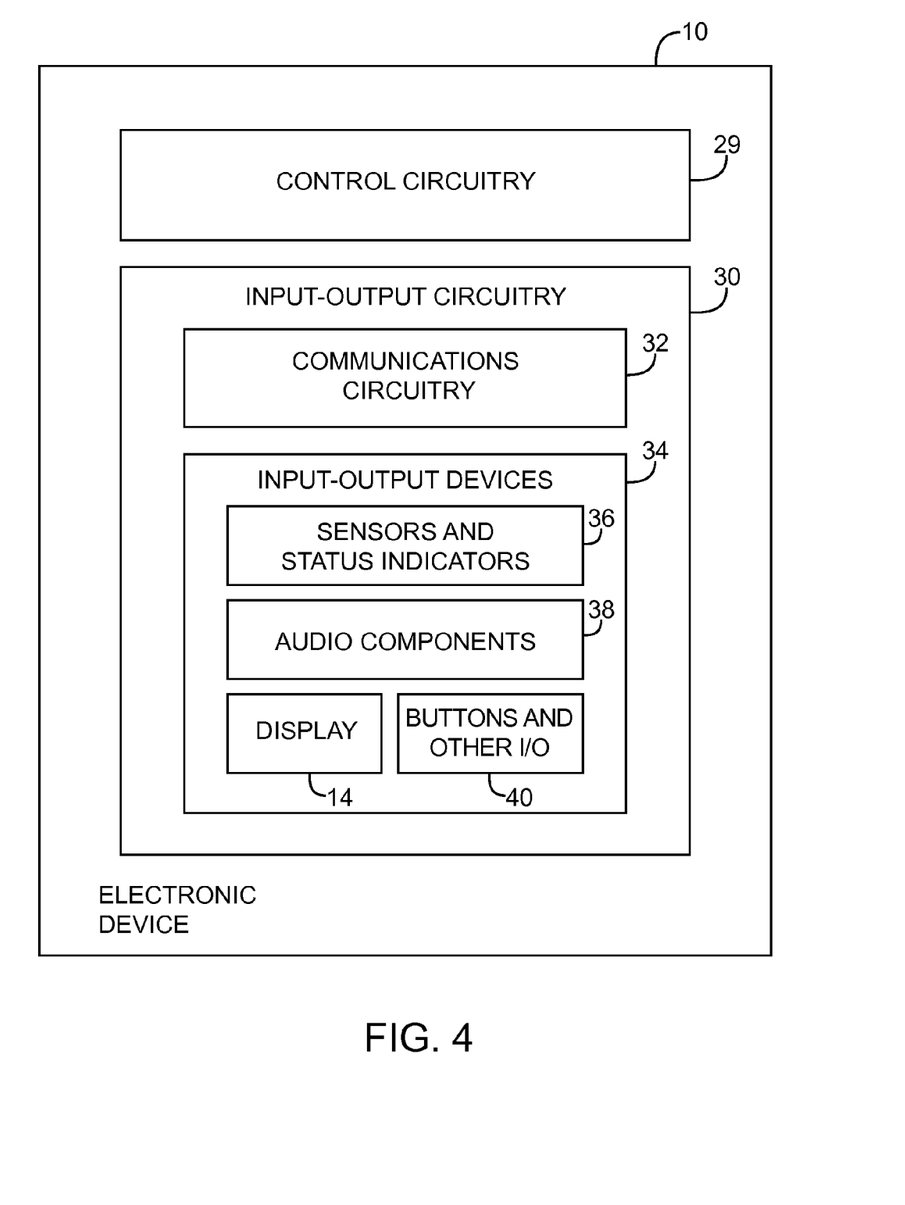
FIG. 4 is a schematic diagram of an illustrative electronic device with a display in accordance with an embodiment of the present invention.

A schematic diagram of an illustrative configuration that may be used for electronic device 10 is shown in FIG. 4. As shown in FIG. 4, electronic device 10 may include control circuitry 29. Control circuitry 29 may include storage and processing circuitry for controlling the operation of device 10. Control circuitry 29 may, for example, include storage such as hard disk drive storage, nonvolatile memory (e.g., flash memory or other electrically-programmable-read-only memory configured to form a solid state drive), volatile memory (e.g., static or dynamic random-access-memory), etc. Control circuitry 29 may include processing circuitry based on one or more microprocessors, microcontrollers, digital signal processors, baseband processors, power management units, audio codec chips, application specific integrated circuits, etc.

Control circuitry 29 may be used to run software on device 10, such as operating system software and application software. Using this software, control circuitry 29 may present information to a user of electronic device 10 on display 14. When presenting information to a user on display 14, sensor signals and other information may be used by control circuitry 29 in making adjustments to the strength of backlight illumination that is used for display 14.

Input-output circuitry 30 may be used to allow data to be supplied to device 10 and to allow data to be provided from device 10 to external devices. Input-output circuitry 30 may include communications circuitry 32. Communications circuitry 32 may include wired communications circuitry for supporting communications using data ports in device 10. Communications circuitry 32 may also include wireless communications circuits (e.g., circuitry for transmitting and receiving wireless radio-frequency signals using antennas).

Input-output circuitry 30 may also include input-output devices 34. A user can control the operation of device 10 by supplying commands through input-output devices 34 and may receive status information and other output from device 10 using the output resources of input-output devices 34.

Input-output devices 34 may include sensors and status indicators 36 such as an ambient light sensor, a proximity sensor, a temperature sensor, a pressure sensor, a magnetic sensor, an accelerometer, and light-emitting diodes and other components for gathering information about the environment in which device 10 is operating and providing information to a user of device 10 about the status of device 10.

Audio components 38 may include speakers and tone generators for presenting sound to a user of device 10 and microphones for gathering user audio input.

Display 14 may be used to present images for a user such as text, video, and pictures. Sensors 36 may include a touch sensor array that is formed as one of the layers in display 14.

User input may be gathered using buttons and other input-output components 40 such as touch pad sensors, buttons, joysticks, click wheels, scrolling wheels, touch sensors such as sensors 36 in display 14, key pads, keyboards, vibrators, cameras, and other input-output components.

Figure 5:
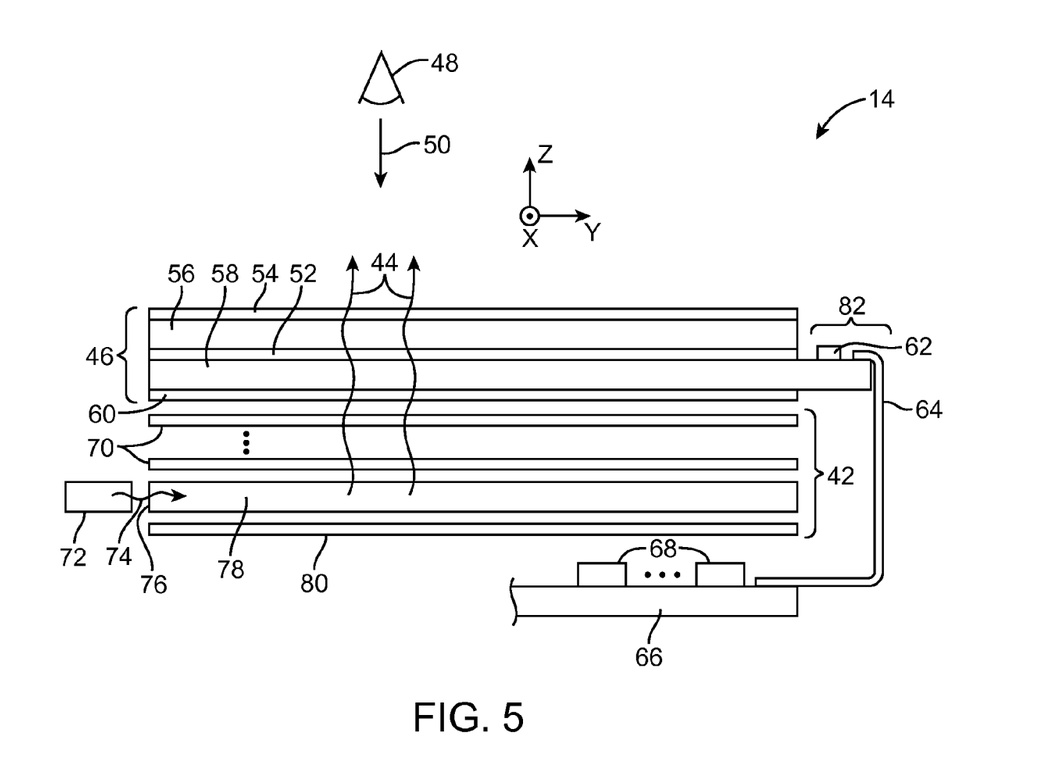
FIG. 5 is a cross-sectional side view of an illustrative display in accordance with an embodiment of the present invention.

A cross-sectional side view of an illustrative configuration that may be used for display 14 of device 10 (e.g., for display 14 of the devices of FIG. 1, FIG. 2, or FIG. 3 or other suitable electronic devices) is shown in FIG. 5. As shown in FIG. 5, display 14 may include backlight structures such as backlight unit 42 for producing backlight 44. During operation, backlight 44 travels outwards (vertically upwards in dimension Z in the orientation of FIG. 5) and passes through display pixel structures in display layers 46. This illuminates any images that are being produced by the display pixels for viewing by a user. For example, backlight 44 may illuminate images on display layers 46 that are being viewed by viewer 48 in direction 50.

Display layers 46 may be mounted in chassis structures such as a plastic chassis structure and/or a metal chassis structure to form a display module for mounting in housing 12 or display layers 46 may be mounted directly in housing 12 (e.g., by stacking display layers 46 into a recessed portion in housing 12). Display layers 46 may form a liquid crystal display or may be used in forming displays of other types.

In a configuration in which display layers 46 are used in forming a liquid crystal display, display layers 46 may include a liquid crystal layer such a liquid crystal layer 52. Liquid crystal layer 52 may be sandwiched between display layers such as display layers 58 and 56. Layers 56 and 58 may be interposed between lower polarizer layer 60 and upper polarizer layer 54.

Layers 58 and 56 may be formed from transparent substrate layers such as clear layers of glass or plastic. Layers 56 and 58 may be layers such as a thin-film transistor layer and/or a color filter layer. Conductive traces, color filter elements, transistors, and other circuits and structures may be formed on the substrates of layers 58 and 56 (e.g., to form a thin-film transistor layer and/or a color filter layer). Touch sensor electrodes may also be incorporated into layers such as layers 58 and 56 and/or touch sensor electrodes may be formed on other substrates.

With one illustrative configuration, layer 58 may be a thin-film transistor layer that includes an array of thin-film transistors and associated electrodes (display pixel electrodes) for applying electric fields to liquid crystal layer 52 and thereby displaying images on display 14. Layer 56 may be a color filter layer that includes an array of color filter elements for providing display 14 with the ability to display color images. If desired, layer 58 may be a color filter layer and layer 56 may be a thin-film transistor layer.

During operation of display 14 in device 10, control circuitry 29 (e.g., one or more integrated circuits such as components 68 on printed circuit 66 of FIG. 5) may be used to generate information to be displayed on display (e.g., display data). The information to be displayed may be conveyed from circuitry 68 to display driver integrated circuit 62 using a signal path such as a signal path formed from conductive metal traces in flexible printed circuit 64 (as an example).

Display driver integrated circuit 62 may be mounted on thin-film-transistor layer driver ledge 82 or elsewhere in device 10. A flexible printed circuit cable such as flexible printed circuit 64 may be used in routing signals between printed circuit 66 and thin-film-transistor layer 60. If desired, display driver integrated circuit 62 may be mounted on printed circuit 66 or flexible printed circuit 64. Printed circuit 66 may be formed from a rigid printed circuit board (e.g., a layer of fiberglass-filled epoxy) or a flexible printed circuit (e.g., a flexible sheet of polyimide or other flexible polymer layer).

Backlight structures 42 may include a light guide plate such as light guide plate 78. Light guide plate 78 may be formed from a transparent material such as clear glass or plastic. During operation of backlight structures 42, a light source such as light source 72 may generate light 74. Light source 72 may be, for example, an array of light-emitting diodes.

Light 74 from light source 72 may be coupled into edge surface 76 of light guide plate 78 and may be distributed in dimensions X and Y throughout light guide plate 78 due to the principal of total internal reflection. Light guide plate 78 may include light-scattering features such as pits or bumps. The light-scattering features may be located on an upper surface and/or on an opposing lower surface of light guide plate 78.

Light 74 that scatters upwards in direction Z from light guide plate 78 may serve as backlight 44 for display 14. Light 74 that scatters downwards may be reflected back in the upwards direction by reflector 80. Reflector 80 may be formed from a reflective material such as a layer of white plastic or other shiny materials.

To enhance backlight performance for backlight structures 42, backlight structures 42 may include optical films 70. Optical films 70 may include diffuser layers for helping to homogenize backlight 44 and thereby reduce hotspots, compensation films for enhancing off-axis viewing, and brightness enhancement films (also sometimes referred to as turning films) for collimating backlight 44. Optical films 70 may overlap the other structures in backlight unit 42 such as light guide plate 78 and reflector 80. For example, if light guide plate 78 has a rectangular footprint in the X-Y plane of FIG. 5, optical films 70 and reflector 80 may have a matching rectangular footprint.

Figure 6:
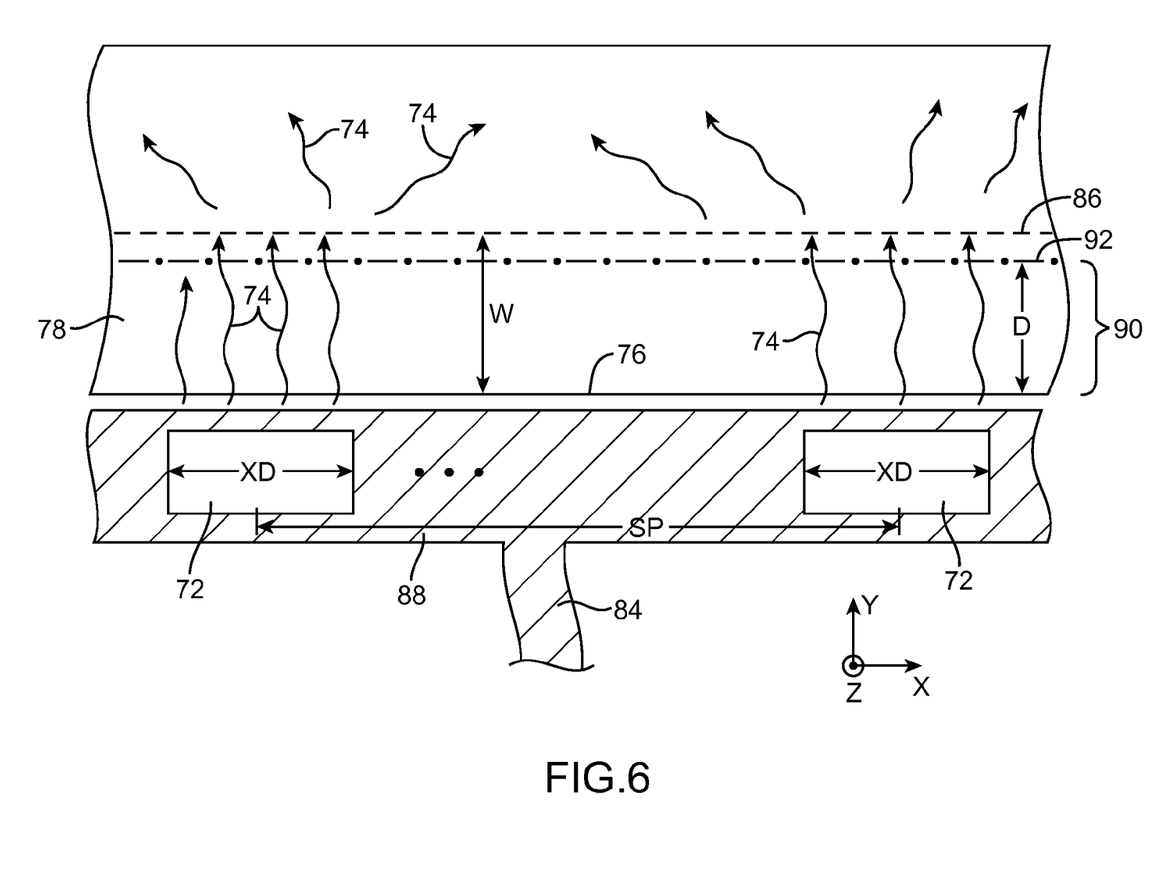
FIG. 6 is a top view of an edge portion of a light guide plate into which light is being emitted from an array of light-emitting diodes in accordance with an embodiment of the present invention.

A top view of an edge portion of light guide plate 78 is shown in FIG. 6. As shown in FIG. 6, light-emitting diodes 72 may be mounted on a substrate such as flexible printed circuit substrate 88. Flexible printed circuit substrate 88 may be formed from a layer of polyimide or a sheet of other flexible polymer. Conductive traces on flexible printed circuit 88 may be used to deliver power to light-emitting diodes 72. Flexible printed circuit 88 may have a tail portion such as tail 84. The traces that are used to deliver power to light-emitting diodes 72 may run along tail 84 and may be coupled to light-emitting diode power circuitry on a printed circuit board such as printed circuit board 66 of FIG. 5.

During operation, light-emitting diodes 72 may produce light 74. Light 74 from each light-emitting diode may be coupled into edge 76 of light guide plate 78. There may be a single row of light-emitting diodes 72 in display 14 or multiple rows of light-emitting diodes 72 in display 14. For example, a first light-emitting diode array such as the array of FIG. 6 may be used to launch light into a first edge of light guide plate 78 (e.g., a left or bottom edge) and a second light-emitting diode array may be used to launch light into an opposing second edge of light guide plate 78 (e.g., a right or top edge).

Light-emitting diodes 72 may be characterized by a width XD (e.g., a width of about 1 mm to 10 mm) and may be spaced from each other with a center-to-center spacing SP (e.g., about 1 mm to 20 mm). As shown in FIG. 6, light 74 is initially concentrated in light guide plate 78 near the exit of each light-emitting diode.

Conventional light guide plates have a surface layer of clear beads to promote light scattering. These beads rely on the principle of light refraction. There is a limit to the effectiveness of bead-based light scattering structures, so it is generally necessary for light to travel at least one center-to-center spacing into the light guide plate before the light is considered to have scattered sufficiently to be free of hotspots. To hide the unsightly concentration of light near the exit of each light-emitting diode, opaque structures are used to cover the edge of the light guide plate. This can give rise to an undesirably large display border.

In display 14 and light guide plate 78 of FIG. 6, light travels a distance W into light guide plate 74 from edge 76 before being sufficiently mixed (at dashed line 86 of FIG. 6). The magnitude of distance W can be minimized by incorporating a diffractive light scattering region of width D (diffractive region 90) along the edge of light guide plate 78. Diffractive region 90 may be formed from a strip of diffractive structures that runs along the border of the main rectangular portion of light guide plate 78. The width of diffractive region 90 (i.e., dimension D) may be less than W, equal to W, or more than W. The diffractive structures of diffractive region 90 may be based on a hologram, a computer-generated hologram, a series of parallel lines (e.g., a grating), other repetitive structures, or other diffractive features for scattering light 74.

The diffractive structures may each be about two to four times the size of a wavelength of light (e.g., at the visible light wavelengths being used to illuminate the backlight structures) or may have other suitable shapes and sizes. In diffractive region 90, the diffractive structures may be repeated a number of times (e.g., in a grating pattern or hologram). The number of times that the diffractive structures are repeated in a grating or hologram may be sufficient to ensure that the diffractive structures will exhibit a high spatial coherence and will be effective at diffracting incoming light 74 (e.g., to mix light 74 with respect to dimension X using diffraction). The diffractive structures of region 90 may be incorporated into the bulk material that makes up light guide plate 78, may be formed on the upper surface of light guide plate 78, may be formed on the lower surface of light guide plate 78, or may otherwise be incorporated into light guide plate 78.

Figure 7:
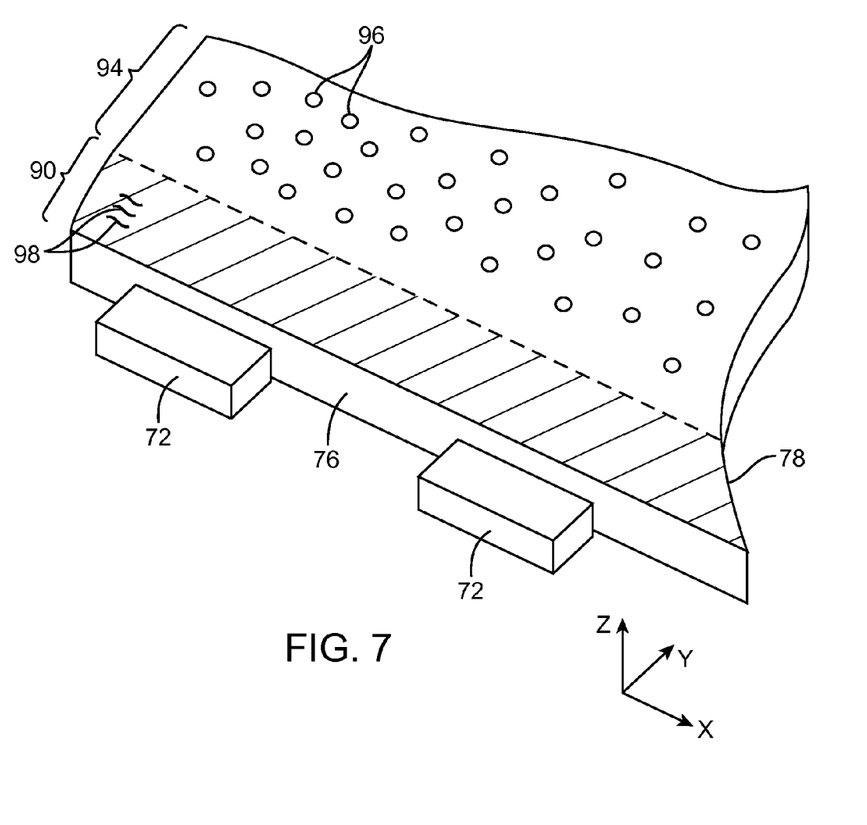
FIG. 7 is a perspective view of an edge portion of a light guide plate having a diffractive light scattering region and a refractive light scattering region in accordance with an embodiment of the present invention.

As shown in FIG. 7, light guide plate 78 may include border region 90 and main region 94. Border region 90 may include diffractive structures 98. Diffractive structures 98 may be bumps, recesses, structures with a different index of refraction from the bulk material that makes up light guide plate 78, or other structures for diffracting light from light-emitting diodes 72. Main portion 94 may have a rectangular shape with four edges and may include refractive light scattering structures 96.

Light scattering structures 96 may be insufficiently regular in size, shape, and/or location and/or may have other characteristics that prevent light scattering structures 96 from significantly diffracting light 74. Nevertheless, light scattering structures 96 may have desirable characteristics such as high backlight efficiency when compared to diffractive structures 98 in diffractive structures region 90. Accordingly, it may be desirable to implement light guide plate 78 using a configuration of the type shown in FIG. 7 in which refraction structures 96 cover the majority of the light guide plate 78 (e.g., a main rectangular portion with four edges such as region 94), whereas diffractive structures 90 fill a narrower border region of light guide plate 78 that is interposed between main portion 94 and the array of light-emitting diodes 72 that runs along edge 76 of light guide plate 78.

Figure 8:
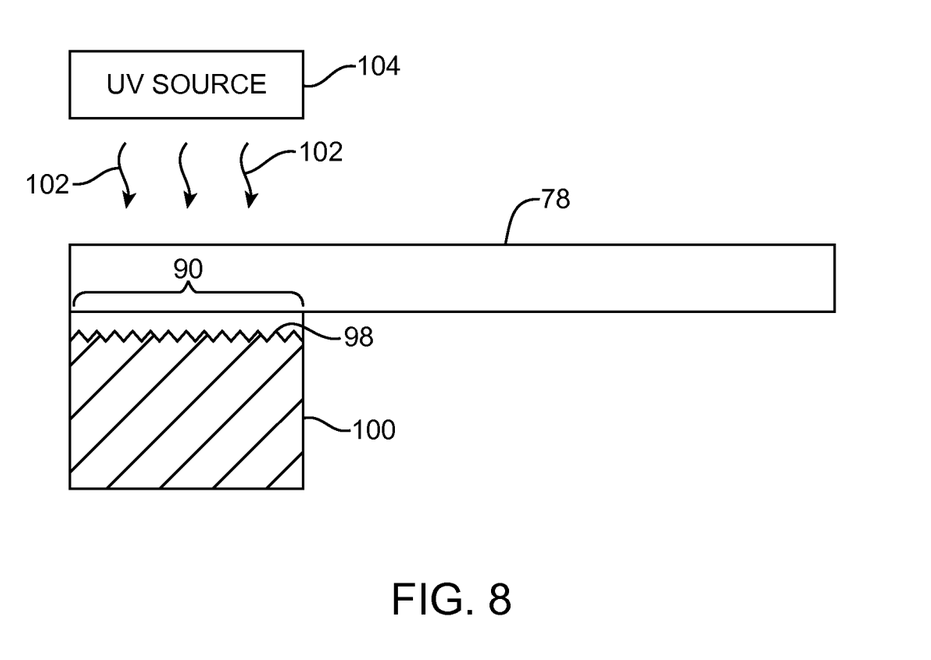
FIG. 8 is a cross-sectional side view of illustrative equipment for providing a light guide plate with a diffractive element in accordance with an embodiment of the present invention.
Figure 9:
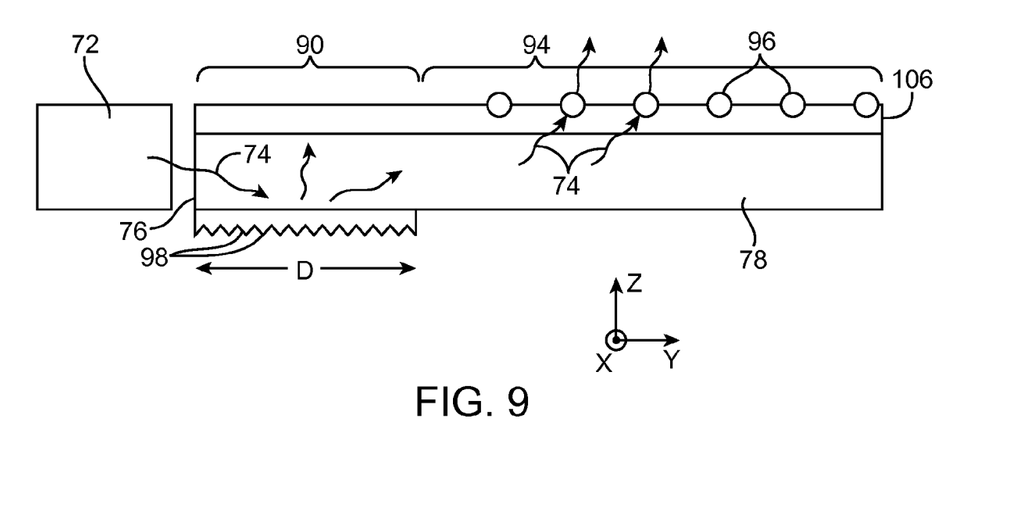
FIG. 9 is a cross-sectional side view of a light guide plate having diffractive and refractive light scattering regions for scattering light in accordance with an embodiment of the present invention.

An illustrative arrangement for forming light diffractive structures and light refractive structures for light guide plate 78 is shown in FIGS. 8 and 9.

As shown in FIG. 8, a tool such as tool 100 may be used to impress a pattern on ultraviolet-light-curable resin (adhesive) 98 in region 90 while ultraviolet (UV) light source 104 applies ultraviolet light 102 to resin 98 through transparent light guide plate 78. Light guide plate 78 may be formed from clear glass or plastic (as examples). Ultraviolet light 102 may pass through light guide plate 78 to cure resin 98 while tool 100 is pressed against resin 98 on the lower surface of plate 78 to form diffractive structures 98 (e.g., ridges in the shape of a hologram, a computer-generated hologram, a series of parallel lines in a grating, or other pattern of diffractive structures).

Tool 100 may have a textured surface for forming features 98 in the resin that has been deposited in diffractive region 90. Once resin 98 has cured, tool 100 may be removed. If desired, other techniques may be used for forming diffractive structures in region 90 (e.g., photolithography, embossing, laser patterning, exposure of photoimageable resin using patterned ultraviolet light, or other fabrication techniques). The arrangement shown in FIG. 8 is merely illustrative.

Once diffractive structures 98 have been formed in diffractive region 90 along the peripheral edge of light guide plate 78, refractive structures may be formed in main (refractive) region 94. Refractive structures may be formed from raised bumps on the front or back surface of light guide plate 78, from pits on the front or back surface of light guide plate 78, or from other refractive structures. With one suitable arrangement, which is illustrated in FIG. 9, refractive light scattering structures 96 may be formed from clear beads (e.g., beads having diameters of about 8 to 10 microns, 4 to 12 microns, or other suitable size).

A clear polymer resin such as resin 106 may be used to attach beads 96 to the upper surface of light guide plate 78. The index of refraction of beads 96 may differ from the index of refraction of layer 106 and/or beads 96 may protrude from the surface of resin 106, thereby causing beads 96 to refract and scatter light 74 that is being guided within the light guide plate.

Diffractive region 90 may be free of beads 96 and other refractive structures or beads 96 may be included in region 90 (e.g., on the upper surface of light guide plate 78). Examples of polymers that may be used in forming diffractive structures 98, light guide plate 78, layer 106, and beads 96 include polyester (e.g., polyethylene terephthalate), acrylic (e.g., polymethylmethacrylate), and polystyrene (as examples).

Due to the presence of diffractive structures 98 in a light guide plate of the configuration shown in FIG. 9, light 74 will mix more strongly than would otherwise be possible (e.g., in lateral dimension X, perpendicular to initial propagation direction Y and vertical dimension). Because light mixing efficiency is enhanced in region 90, the width D of region 90 (and the total width needed for effective mixing), may be relatively small, thereby reducing the size of light guide plate 78 without adversely affecting the quality of the light mixing that is performed by light guide plate 78 along its edge. In main region 94, refractive light scattering structures 96 may be used to provide efficient light scattering for light guide plate 78.

Figure 10:
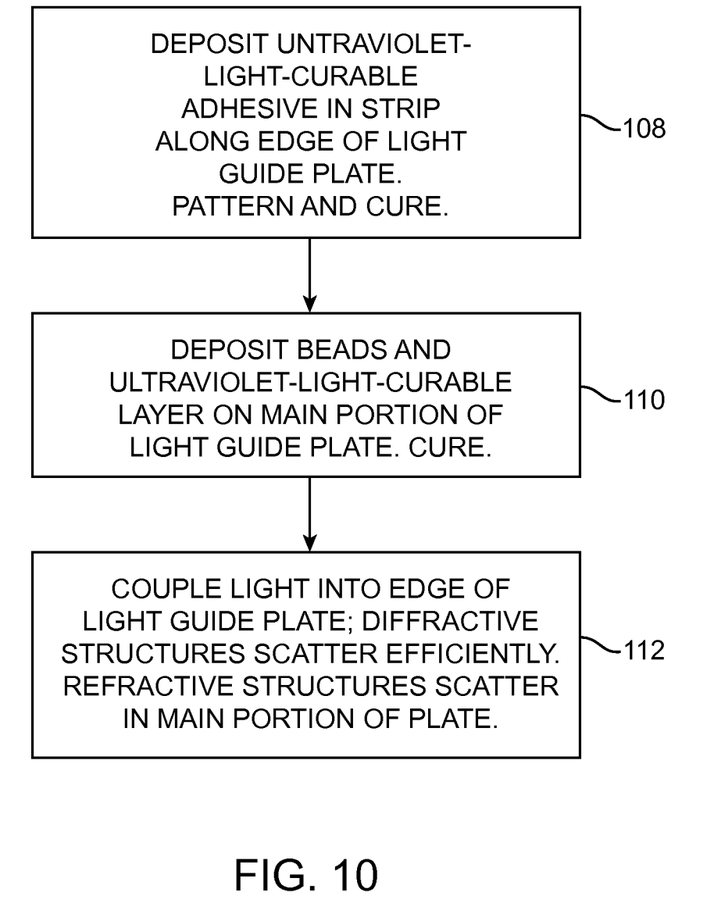
FIG. 10 is a flow chart of illustrative steps involved in forming and using a backlight having a light guide plate with diffractive and refractive light scattering regions in accordance with an embodiment of the present invention.

Illustrative steps involved in forming and using displays having diffractive light scattering regions such as region 90 and refractive light scattering regions such as region 94 are shown in FIG. 10.

At step 108, a liquid polymer or other material for forming diffractive light scattering structures 98 may be deposited on light guide plate 78. The liquid polymer may be, as an example, an ultraviolet-light-curable polymer. A strip-shaped border region of light guide plate 78 that runs along the edge of light guide plate 78 adjacent to light-emitting diodes 72 may be coated with the liquid polymer. Using equipment such as tool 100 or other fabrication equipment, the polymer may be cured and patterned with diffractive structures 98. Diffractive structures 98 may be created by embossing, by curing followed by photolithography and etching, by exposing a photoimageable polymer to a holographic or grating pattern, by using laser patterning, or by otherwise forming diffractive structures 98 in or on light guide plate 78.

At step 110, refractive light scattering structures 96 may be formed in main portion 94 of light guide plate 78. As an example, a liquid polymer containing clear polymer beads may be spun on or sprayed on the surface of light guide plate 78 and cured using heat or exposure to ultraviolet light.

At step 112, light guide plate 78 may be assembled into display 14 and device 10 and used in providing backlight for display 14. During operation, light 74 may be emitted from light-emitting diodes 72 and may be coupled into edge 76 (e.g., a flat vertical edge surface) of light guide plate 78. Diffractive light scattering structures 98 in region 90 may efficiently mix the light that is emitted from light-emitting diodes 72, so that the mixing region portion of light guide plate 78 may be minimized in size. Refractive light scattering structures 96 may scatter light efficiently in main region 94, thereby enhancing backlight efficiency.

The foregoing is merely illustrative of the principles of this invention and various modifications can be made by those skilled in the art without departing from the scope and spirit of the invention.

What is claimed is:

1. A display, comprising:
    display layers that display images; and
    backlight structures that provide backlight for the display layers, wherein the backlight structures include a light source that emits light and a light guide plate that receives the light from the light source, wherein the light guide plate has a first region with refractive light scattering structures that scatter the light from the light source to serve as the backlight and has a second region interposed between the first region and the light source, wherein the second region has diffractive light scattering structures that mix the light before the light is scattered by the refractive light scattering structures, wherein the diffractive light scattering structures comprise holographic structures that are formed of a different material than the light guide plate, wherein the light guide plate has opposing first and second surfaces, wherein the refractive light scattering structures are formed on the first surface, and wherein the diffractive light scattering structures are formed on the second surface.

2. The display defined in claim 1 wherein the refractive light scattering structures comprise clear beads.

3. The display defined in claim 1 wherein the display layers overlap the first region and wherein the second region forms a strip that runs along a peripheral edge of the first region.

4. The display defined in claim 1 wherein the diffractive light scattering structures comprise a patterned layer of resin formed in a strip running along a border of the light guide plate.

5. The display defined in claim 4 wherein the resin comprises ultraviolet-light-curable resin.

6. The display defined in claim 5 wherein the refractive light scattering structures comprise clear beads.

7. The display defined in claim 6 wherein the patterned layer of resin is formed on the second surface and wherein the clear beads are formed on the first surface.

8. The display defined in claim 7 wherein the light source comprises light-emitting diodes.

9. The display defined in claim 8 wherein the display layers include a liquid crystal layer.

10. The display defined in claim 9 wherein the display layers include a color filter layer and a thin-film-transistor layer and wherein the liquid crystal layer is interposed between the color filter layer and the thin-film-transistor layer.

11. A display, comprising:
    at least one display layer;
    a light guide plate that provides backlight for the display layer, wherein the light guide plate has a first surface that emits light towards the at least one display layer, a second surface opposite the first surface, and a rectangular periphery with four edge surfaces; and
    light-emitting diodes arranged along a given one of the four edge surfaces that emit light into the light guide plate through the given one of the four edge surfaces, wherein the light guide plate has a rectangular region containing light scattering structures formed on the first surface that scatter the light so that the light serves as the backlight for the display layer, wherein the light guide plate has a border region between the rectangular region and the given edge, wherein the light guide plate includes diffractive light guide structures formed on the second surface in the border region that mix the light by diffraction, wherein the light scattering structures comprise refractive light scattering structures that are formed in the border region and that overlap the diffractive light guide structures, and wherein the diffractive light guide structures have an index of refraction that is different than an index of refraction of the light guide plate.

12. The display defined in claim 11 wherein the diffractive light guide structures comprise a layer of resin on the second surface of the light guide plate.

13. The display defined in claim 12 wherein the layer of resin comprises a layer of ultraviolet-light-curable resin with a holographic pattern.

14. The display defined in claim 12 wherein the layer of resin comprises a layer of ultraviolet-light-curable resin with a grating pattern.

15. A display, comprising:
    an upper polarizer;
    a lower polarizer;
    a thin-film-transistor layer between the upper and lower polarizers;
    a color filter layer between the upper and lower polarizers;
    a liquid crystal layer between the thin-film transistor layer and the color filter layer;
    a light guide plate having edges and a border strip of diffractive light scattering structures that runs along one of the edges, wherein the diffractive light scattering structures comprise a layer of resin deposited on a surface of the light guide plate, wherein the light guide plate has a main region that includes refractive light scattering structures, wherein the diffractive light scattering structures and the refractive light scattering structures do not overlap, wherein the layer of resin and the light guide plate are formed of different materials, and wherein the liquid crystal layer overlaps the border strip of diffractive light scattering structures; and
    an array of light-emitting diodes that emits light into the light guide plate, wherein the diffractive light scattering structures mix the light.

16. The display defined in claim 15 wherein the refractive light scattering structures scatter the light that is mixed by the diffractive light scattering structures so that the light passes through the liquid crystal layer and wherein the border strip is located between the array of light-emitting diodes and the main region.

17. The display defined in claim 10 wherein the light-emitting diodes are configured to launch light towards the light guide plate along a first dimension, wherein the backlight passes through the display layers along a second dimension that is perpendicular to the first dimension, and wherein the diffractive light scattering structures mix the light from the light source with respect to a third dimension that is perpendicular to the first dimension and the second dimension.

18. The display defined in claim 12 wherein the refractive light scattering structures refract the light without diffracting the light.

19. The method defined in claim 11, wherein the refractive light scattering structures have a maximum width less than or equal to 12 microns.

* * * * *